Aug. 19, 1952  LA VERNE R. PHILPOTT  2,607,914
ECHO RANGING CIRCUIT
Filed Feb. 3, 1945  2 SHEETS—SHEET 2
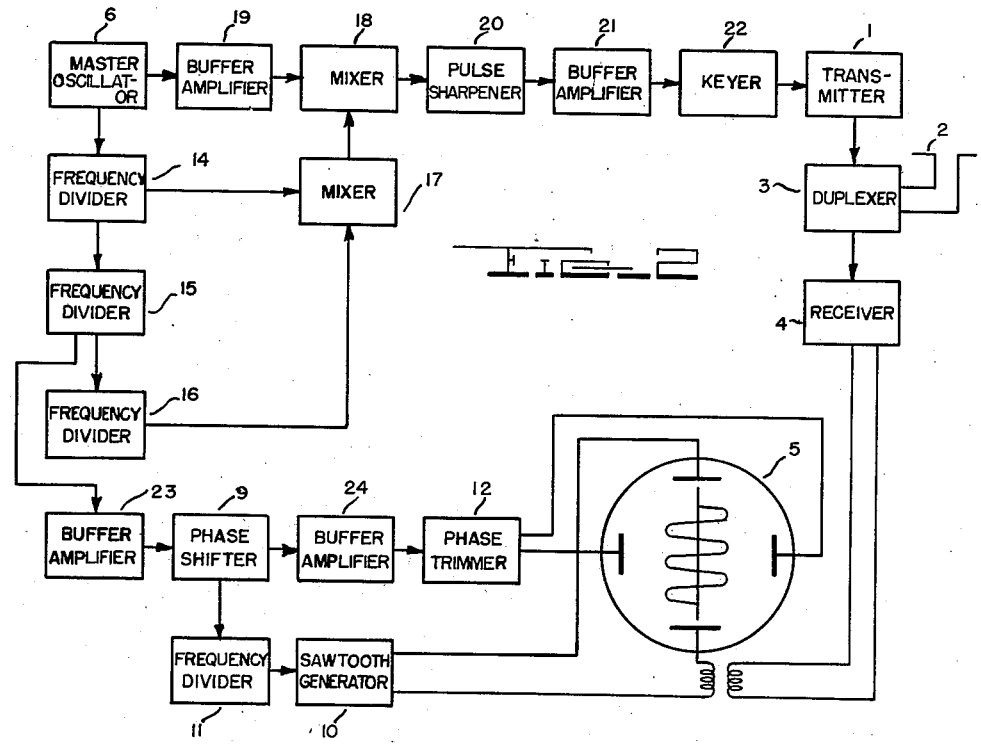
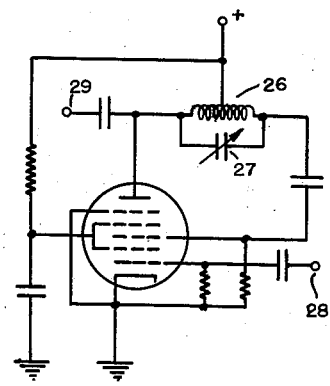
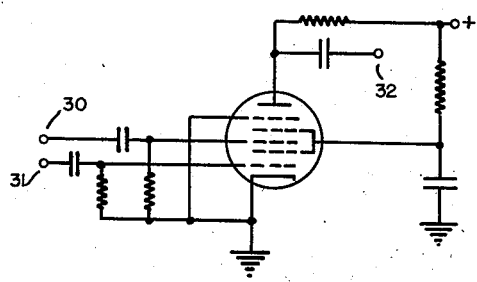
Inventor
LA VERNE R. PHILPOTT
By Murray O. Hayes
Attorney

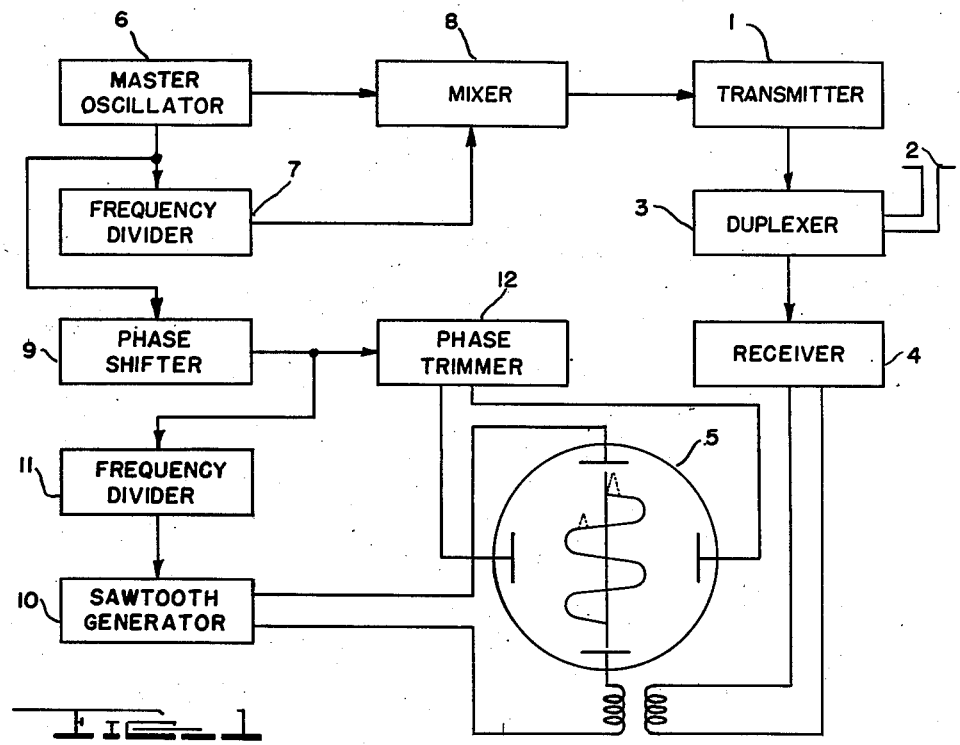
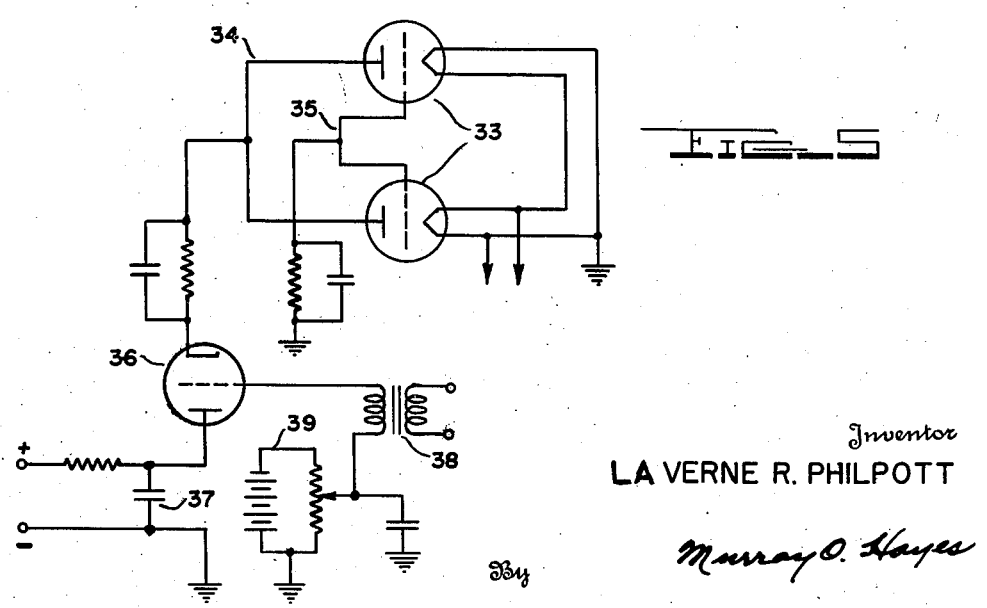

Patented Aug. 19, 1952

2,607,914

UNITED STATES PATENT OFFICE 2,607,914

ECHO RANGING CIRCUIT

La Verne R. Philpott, Washington, D. C.

Application February 3, 1945, Serial No. 576,112

9 Claims. (Cl. 343—13)

(Granted under the act of March 3, 1883, as amended April 30, 1928; 370 O. G. 757)

This invention relates to echo ranging systems, and is directed to the problem of time interval measurement by oscillographic means.

As is well understood, echo ranging systems may comprise an impulse transmitter, an oscilloscope provided with a timing locus, and means for applying a voltage to the oscilloscope on transmission of an impulse and on the return of an echo. The invention is primarily concerned with systems wherein the transmitter is controlled by a keying voltage to effect the inauguration of an impulse. In such operation the transmitter is conveniently pulsed at definite intervals determining the period of the impulse frequency. The keying control voltage, under these circumstances, will determine the phase with respect to the impulse frequency at which the transmitter fires, and may therefore be described as a phasing signal. It is to be clearly recognized that the impulse frequency and phasing control refer in no way to the carrier frequency signal which is generated by the transmitter during operation, and which normally is of the order of hundreds or thousands of megacycles per second, whereas the impulse frequency normally lies within the audio range.

In particular, the invention provides a highly accurate keying signal for the transmitter and the simultaneously supplied sweep signal voltages which establish the timing on the oscilloscope. Manifestly such a timing circuit is applicable to the determination of the interval between any event caused to occur by the keying voltage and a subsequent event, or the duration of an event caused by the keying voltage, as well as in the application primarily contemplated.

The transmitter is supplied with a sharply peaked phasing voltage having a fundamental period of the desired pulse frequency. It has been ascertained that an impulse transmitter operates under synchronization with a certain phase inaccuracy; and where a sine wave impulse frequency keying waveform is relied upon, such inaccuracy is sufficient to prevent high precision ranging, particularly in short distance operation, as for instance in an altimeter. It is accordingly an object of the present invention to supply a complex synchronizing voltage, of impulse frequency, but having higher frequency components combined therewith, whereby steep wavefront sections are obtained, resulting in greatly increased keying phase accuracy and in extreme range precision.

It is a further object of the invention to establish a long timing locus on the oscilloscope for increasing the reading accuracy of the indication.

Another object of the invention is to provide, for ranging purposes, for the establishment of any desired interval between the keying of the transmitter and the inauguration of the timing trace. Variation of such interval shifts the indication pattern bodily along the timing locus and permits accurate ranging by effecting successive coincidence of the transmitted and received signals with a marker characteristic on the timing locus. The differential interval is a covariant of the range and the interval control means may therefor be directly calibrated in distance when coincidence of the transmitter impulse with the marker is taken arbitrarily as zero interval.

The invention will be further understood with reference to the drawings in which:

Fig. 1 is a block diagram of an echo ranging system embodying the present invention, Fig. 2 is a block diagram of another echo ranging system of the present invention, Fig. 3 is a schematic circuit diagram of a frequency divider suitable for use in the invention, Fig. 4 is a schematic circuit diagram of a mixer suitable for use in the invention, and Fig. 5 is a schematic circuit diagram of a transmitter suitable for use in the invention.

The system of Fig. 1 employs keyed impulse transmitter 1 feeding antenna 2. The antenna, shown as a dipole, may in practice embody any of the types having more highly directional characteristics. Where it is desired to employ the same antenna for transmission and reception, it may be fed through a suitable duplexing system 3 such as described in application S. N. 326,640 filed March 29, 1940, by Leo C. Young and Robert M. Page for Impedance Control Coupling and Decoupling System.

The antenna is coupled to receiver 4, which is protected from injury by high signal levels during transmission through operation of duplexer 3, although it receives sufficient energy to provide indication of the transmitted impulse. After transmission, the receiver is correctly matched through to the antenna for reception of the returned impulse, or echo, and consequently is operative to furnish an indication thereof. The receiver feeds oscilloscope 5, and in the present embodiment is coupled to the vertical deflection plates so that impulse signals are indicated by deflections from the timing locus. A representative transmitter impulse and a single echo are shown in dotted line in Fig. 1.

The transmitter control and sweep voltages are derived from the master control oscillator 6, which supplies a recurrent voltage sine wave at a frequency equal to a multiple of the desired impulse frequency.

A frequency divider 7 is fed by the master control oscillator and furnishes an output of impulse frequency. The divider is further characterized in that each extremum of its output, of selected polarity, coincides with one extremum of the same polarity of the output of the master control oscillator. Consequently, mixer 8 receives the outputs of oscillator 6 and divider 7, the combined wave supplied from the mixer output carries a sharp extremum of high frequency superposed on the low frequency extremum, and this wave form permits highly accurate keying of transmitter 1.

The master oscillator 6 supplies the sweep voltages through phase shifter 9, which may conveniently be a goniometer type instrument. The output of the phase shifter is employed in the production of both vertical and horizontal sweeps for oscilloscope 5. In the present embodiment, a sinuous sweep is produced. The horizontal deflection plates are fed from the output from the phase shifter, and the vertical deflection plates are supplied with a linear sweep from generator 10. This generator is synchronized by frequency divider 11 also fed from the output of phase shifter 9.

The frequency divider 11 effects the same frequency shift as divider 7 described above. The frequency divider is also operative to supply an output signal having its extrema of one polarity in coincidence with one of the extrema of the same polarity of the input thereto. Phase trimmer 12 is provided for setting the correct time relations of the sinusoidal and saw tooth sweep voltages.

The operation of the system depends upon the control voltages derived from the master oscillator. As above described, the transmitter is keyed by the mixer output, and generates an impulse every Nth cycle of the master oscillator output, wherein N is the ratio of frequency division. The transmitter keys accurately on the steep wave front of the master oscillator extremum, so that the phase accuracy with respect to the impulse frequency is high.

The sweep voltages are caused to trace the timing locus a controllable interval before or after impulse generation through the operation of the phase shifter. The saw tooth generator will normally fire near the peaks of the voltage wave from divider 11, and inaugurates the vertical sweep. As the phase shifter is varied to control the input to the divider, the time phase of its output is varied an equal amount, and the phase of the saw tooth wave is correspondingly varied.

The sinusoidal deflection voltage from the phase shifter is applied to the horizontal deflection plates through phase trimmer 12. The latter may be employed if necessary in order to establish the desired time relation between the horizontal and vertical deflection voltages. As shown in Fig. 1, it is preferred that at the inauguration of the vertical sweep, the sinusoidal voltages be passing through zero, rather than to have another arbitrary value. The phase trimmer may be adjusted to effect this result. As the saw tooth wave trips near a maximum of the phase shifter output, the phase trimmer will normally shift the sinusoidal voltage by 90°.

As the time delay established by the phase shifter on the sinusoidal sweep is equal to that of the divider output and therefor that of the sawtooth sweep, the same timing sweep pattern is presented on the screen regardless of the operation of the phase shifter. The latter, therefor, simultaneously varies the phase of the master oscillator sweep signal and the lower frequency sweep signal by amounts proportional to their frequencies and thus controls the interval between the transmitter keying and the timing trace inauguration.

This operation varies the position of the indicated impulse and echo pattern along the length of the sweep, and permits ranging by successive juxtaposition of the transmitter impulse and the desired echo with a marker. Such a marker may be produced electronically if desired, and applied to a beam controlling element of the oscilloscope. However, the marker shown is a line on the oscilloscope face intersecting the timing axis at equally spaced intervals, and corresponds to electronically produced markers produced under synchronization with the sweep signals to divide the time base as desired.

With the pattern shown, the phase shifter, calibrated in distance, will be set at zero when the transmitter impulse appears at the beginning of the sweep. Range will be read where the selected echo is set to coincidence with the marker at this point. Alternately the echo may be brought to the closest adjacent intersection of the marker and sweep, and the range determined from the correction effected added to the known range of the selected marker intersection.

In Fig. 2 is shown another embodiment of the invention including some refinements not employed in the system of Fig. 1, but operating according to the principles above described. The transmitter 1, antenna 2, duplexer 3, and receiver 4 are as described in connection with Fig. 1.

Master oscillator 6 feeds a plurality of frequency dividers 14, 15, 16 the output of the last establishing the impulse frequency. Each divider operates to supply a low frequency extremum coinciding with a high frequency extremum of its input signal. The outputs of the master oscillator 6 and dividers 14 and 16 are combined to provide the transmitter synchronizing voltage. The resultant complex waveform, including the impulse frequency carrying upon its extrema two superposed peaks of higher frequency, keys the transmitter through suitable synchronizing circuits.

Mixer 17 receives the output of dividers 14 and 16, and supplies the combined wave form to mixer 18 which receives a voltage of master oscillator frequency from buffer amplifier 19. The complex output from mixer 18 is fed through a pulse sharpener 20 comprising a normally blocked tube becoming operative on the superposed extrema, which are introduced as a positive voltage in the grid circuit, to produce a sharp plate pulse further sharpened by buffer amplifier 21. The steep wave front from 21 fires the transmitter 1 through keyer 22.

The sweep voltages are derived from divider 15, which feeds phase shifter 9 through buffer 23. The latter component supplies the signal to divider 11, which has the same division ratio as divider 16, and buffer 24. Divider 11 synchronizes saw tooth sweep 10, whose output is applied to the vertical plates of oscilloscope 5. Buffer 24 supplies the horizontal sweep through phase trimmer 12.

The operation of this system is similar to that of Fig. 1. The range accuracy will be appreciably greater however, due to the increased frequency stability of the master oscillator resulting from the buffer amplifier employed, and from the increased phase accuracy of the transmitter keying due to the greater frequency ratio between the impulse frequency and the highest frequency component of the transmitter keying voltage.

The components of the systems shown in Figs. 1 and 2 are well known in various application, and in most cases any of the conventional constructions may be satisfactorily employed. The frequency ranges of the operating voltages being such as not to raise particularly difficult design problems. This is particularly true of the master oscillator, frequency dividers, buffer amplifiers, pulse sharpener, phase shifter, and sawtooth sweep. However, exemplary circuits of certain components suitable for use with the invention are illustrated in the succeeding figures. It will be understood that such circuits, in common with the block diagrams of Figs. 1 and 2, are illustrative only and not to be construed as defining the limits of the invention or of the appended claims.

In the circuits shown Figs. 3 to 5, it is assumed that the master control oscillator supplies a sine wave output, and the same type of signal is produced by the dividers disclosed. For this type of operation any conventional sine wave generator may be used for the master control oscillator. The divider employed is of the synchronized type of Hartley circuit, shown in Fig. 3. The tank circuit comprising inductance 26 and variable condenser 27 is tuned to a submultiple of the signal frequency introduced to a control grid at terminal 28. By careful adjustment of condenser 27 under oscilloscope monitoring of the input and output signals at terminals 28 and 29 respectively it is simple to establish the low frequency peak of the desired polarity in coincidence with a high frequency peak of the same polarity.

In Fig. 4 is shown a mixer unit for combining a plurality of signals, from the master oscillator and a frequency divider or from successive frequency dividers. This includes a pentagrid tube in which the input signals are introduced at terminals 30 and 31, the complex output wave being taken off at terminal 32 across the plate load resistor. A suitable transmitter for operation in the system is shown in Fig. 5, comprising pushpull triodes 33 with high frequency resonant line section tanks 34 and 35 in the plate and grid circuits respectively. The transmitter is plate keyed through gaseous discharge tube 36 from potential storage source 37. Tube 36 is fired by the synchronizing voltage introduced in its grid circuit through coupling transformer 38. Bias control potentiometer 39 is provided for adjusting the static conditions of tube 36 for firing under the sharp positive extremum introduced in the grid circuit. Tube 36 and transformer 38 constitute together kever 22 shown in Fig. 2.

In a transmitter of this type the impulse duration will be determined by the charge on storage element 37 and tube 36 will extinguish at the end of the impulse so that the system is cyclic in operation.

The invention described herein may be manufactured and used by or for the Government of the United States of America for governmental purposes without the payment of any royalties thereon or therefor.

I claim:

1. In an echo ranging system including an impulse transmitter, a receiver for detecting the transmitted impulse and a returned impulse, an oscillograph responsive to the receiver output, means for generating sweep voltages for the oscillograph operative to establish a timing locus thereon for indicating the time relations of the transmitted and returned impulses, comprising a source of sinusoidal voltage, a frequency divider, a phase shifter coupling said sinusoidal voltage to said divider, means for feeding the output of said divider to one pair of deflecting plates of said oscillograph and means for feeding the output of said phase shifter to the other pair of deflecting plates of said oscillograph.

2. In an echo ranging system including an impulse transmitter, a receiver for detecting the transmitted impulse and a returned impulse, an oscillograph responsive to the receiver output, means for generating sweep voltages for the oscillograph operative to establish a timing locus thereon for indicating the time relations of the transmitted and returned impulses comprising a source of sinusoidal voltage, a frequency divider, a phase shifter coupling said sinusoidal voltage to said divider, means for feeding the output of said divider to one pair of deflecting plates of said oscillograph and means for feeding the output of said phase shifter to the other pair of deflection plates of said oscillograph marker characteristic means on the timing locus.

3. In an echo ranging system including an impulse transmitter, a source of alternating voltage, means including a frequency divider for keying said impulse transmitter from said alternating voltage at a subharmonic frequency thereof, a receiver for detecting the transmitted impulse and a returned impulse, an oscillograph responsive to the receiver output, means for generating sweep voltages for the oscillograph operative to establish a sinuous timing locus thereon for indicating the time relations of the transmitted and returned impulses, comprising a second frequency divider having a divider ratio similar to the first mentioned divider, a phase shifter coupling said alternating voltage to said second divider, means for feeding the output of said second divider to one pair of deflection plates of said oscillograph and means for feeding the output of said phase shifter to the other pair of deflection plates of said oscillograph.

4. A timing sweep generator for a cathode ray oscillograph having two pair of deflection means, including a saw tooth voltage generator coupled to one pair of the deflection means of said oscillograph, a sine wave voltage generator having a frequency equal to a multiple of said saw tooth generator, and means including a phase shifter coupling the output of said sine wave voltage generator to the other pair of said deflection means and to said saw-tooth generator to synchronize the same at a subharmonic of said sine wave voltage frequency, said phase shifter being operative simultaneously to vary the phase of the voltage applied to both pair of deflection means by amounts proportional to their frequencies.

5. A timing sweep generator for a cathode ray oscillograph having two pair of deflection means, comprising a pair of recurrent voltage wave generators supplying harmonically related frequencies and means including a phase shifter coupling the output of the higher frequency generator to one pair of deflection means of said cathode ray oscillograph and also to said lower frequency generator to synchronize the same at a subharmonic of the higher frequency generator, said lower frequency generator being coupled to the other pair of deflection means, and said phase shifter being operative simultaneously to shift the phase of said deflection voltage waves by amounts proportional to their frequencies.

6. In an echo ranging system including an impulse transmitter, a receiver responsive to the transmitted impulse and to a returned impulse, and a cathode ray oscilloscope fed by the receiver, circuit means for generating a timing locus on the oscilloscope comprising a source of recurrent voltage, a phase shifter fed by said source, a frequency divider fed by the phase shifter, a saw tooth generator synchronized by the output of the frequency divider, means for feeding the output of the saw tooth generator to one pair of deflection plates, and means for feeding the output of the phase shifter to the other pair of deflection plates.

7. In an echo ranging system including an impulse transmitter, an impulse receiver for detecting the transmitter impulse and a returned impulse, and an oscilloscope fed by the receiver, a master control oscillator, frequency divider means fed by said oscillator operative to supply a voltage wave sub-harmonically related to the master oscillator wave, means for combining said waves, and a control circuit for keying the transmitter operating in dependency on said combined wave, means responsive to the master oscillator operative to supply a wave having a frequency equal to a multiple of the frequency divider output, means for shifting the phase of such wave, second frequency divider means fed by the phase shifter means operative to divide the frequency by said multiple, a sweep generator operating in independency on the output of the second frequency divider, and means for applying the phase shifter and sweep generator output waves to the oscilloscope to form a timing locus.

8. A timing device including means for generating a signal, means for receiving said signal and a subsequent signal, an oscilloscope fed by the receiving means and having a sweep circuit establishing a timing locus for determining the interval between said signals, a control circuit for the signal generating means, a control circuit for the sweep circuit, a recurrent voltage source, frequency divider means driven by said source, means combining the outputs of the recurrent voltage source and the frequency divider means, means feeding the combined wave to one of said control circuits, and means feeding the other control circuit with a wave having said divider frequency.

9. A timing device including means for generating a signal, means for receiving said signal and a subsequent signal, an oscilloscope fed by the receiving means and having a sweep circuit establishing a timing locus for determining the interval between said signals, a control circuit for the signal generating means, a control circuit for the sweep circuit, a recurrent voltage source, frequency divider means driven by said source, means combining the output of the recurrent voltage source and the frequency divider means, means feeding the combined wave to one of said control circuits, and means feeding the other control circuit with a wave having said divider frequency, and means for shifting the phase of one of said waves fed to a control circuit.

LA VERNE R. PHILPOTT.

REFERENCES CITED

The following references are of record in the file of this patent:

UNITED STATES PATENTS

| Number | Name | Date |
|---|---|---|
| 2,121,359 | Luck | June 21, 1938 |
| 2,189,549 | Hershberger | Feb. 6, 1940 |
| 2,227,598 | Lyman et al. | Jan. 7, 1941 |
| 2,340,539 | Koschmieder | Feb. 1, 1944 |
| 2,357,398 | Gray | Sept. 5, 1944 |
| 2,360,466 | Bedford et al. | Oct. 17, 1944 |
| 2,373,145 | Sensiper et al. | Apr. 10, 1945 |
| 2,403,625 | Wolff | July 9, 1946 |
| 2,405,238 | Seeley (1) | Aug. 6, 1946 |
| 2,405,239 | Seeley (2) | Aug. 6, 1946 |
| 2,423,082 | Busignies | July 1, 1947 |

FOREIGN PATENTS

| Number | Country | Date |
|---|---|---|
| 784,425 | France | July 22, 1935 |